(12) United States Patent
Mugler et al.

(10) Patent No.: US 6,314,327 B1
(45) Date of Patent: Nov. 6, 2001

(54) METHOD FOR PREDICTING FUTURE FUNCTION VALUES UTILIZING DERIVATIVE SAMPLES

(75) Inventors: Dale H. Mugler, Hudson; Yan Wu, Cuyahoga Falls, both of OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/067,835

(22) Filed: Apr. 28, 1998

(51) Int. Cl.[7] .................................................. G05B 13/02
(52) U.S. Cl. ................................ 700/44; 700/40; 700/42; 701/45
(58) Field of Search .............................. 700/28, 40, 42, 700/44; 701/42, 45–47, 58, 60

(56) References Cited

U.S. PATENT DOCUMENTS

| | | | |
|---|---|---|---|
| 5,394,322 | * 2/1995 | Hansen | 700/44 |
| 5,502,658 | 3/1996 | Relin | 364/565 |
| 5,513,109 | 4/1996 | Fujishima | 364/424.05 |
| 5,546,307 | 8/1996 | Mazur et al. | 364/424.05 |
| 5,559,697 | 9/1996 | Wang | 364/424.05 |
| 5,583,771 | 12/1996 | Lynch et al. | 364/424.045 |
| 5,602,736 | 2/1997 | Toya et al. | 364/424.055 |
| 5,608,628 | 3/1997 | Drexler et al. | 364/424.055 |

* cited by examiner

Primary Examiner—Paul P. Gordon
(74) Attorney, Agent, or Firm—Renner, Kenner, Greive, Bobak, Taylor & Weber

(57) ABSTRACT

A system and method for calculating a future function value, such as velocity, for an object, from derivative values, such as acceleration, includes a sensor, such as an accelerometer, coupled to an object, such as a car. By predetermining a sampling rate of the derivative values and determining the highest frequency in the sampled signal, a set of prediction coefficients can be derived for use in a prediction formula which generates the future function value. A processor, which derives the prediction coefficients and implements the prediction formula may use the future function value to control operation of the object or a related object. By including a past function value in the prediction formula, a highly accurate future function value can be determined.

7 Claims, 1 Drawing Sheet

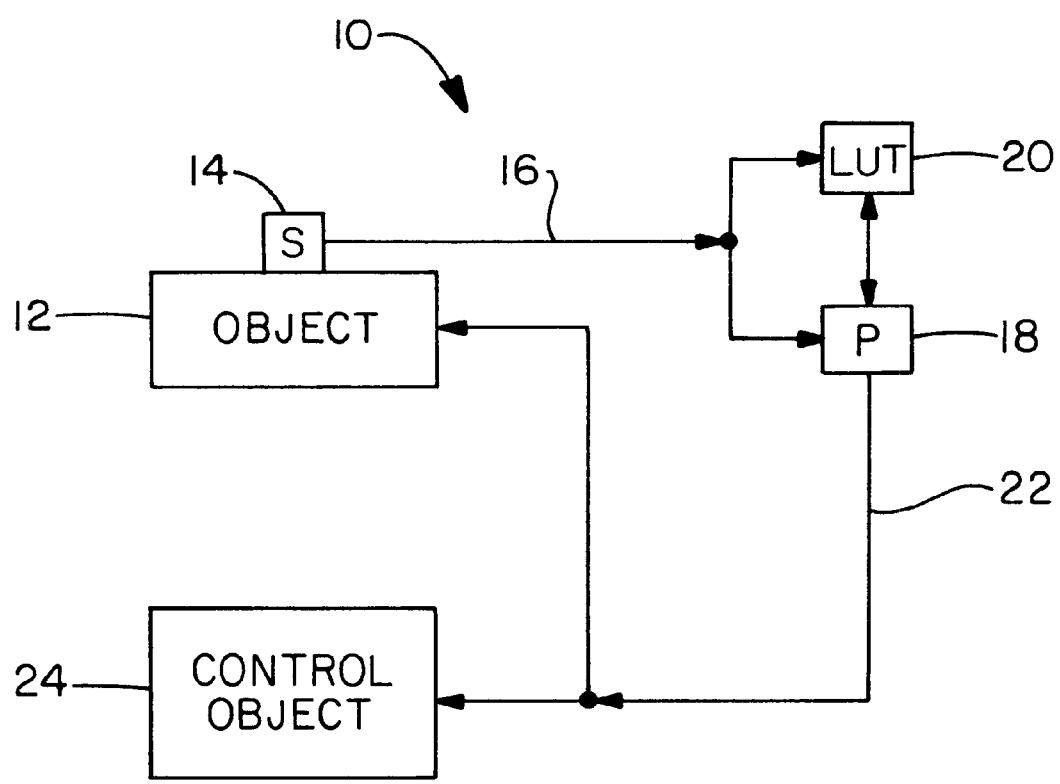

METHOD FOR PREDICTING FUTURE FUNCTION VALUES UTILIZING DERIVATIVE SAMPLES

TECHNICAL FIELD

The present invention herein resides in the art of predicting a function value from a set of past derivative values. More particularly, the present invention relates to integrators that provide high accuracy for polynomials and oscillatory functions. Specifically, the present invention relates to a predictor-corrector integrator that provides improved accuracy and larger stability regions over known polynomial-based integrators.

BACKGROUND ART

In certain applications it is very beneficial to be able to predict the future velocity of a moving object. For example, such information could be employed to calculate velocities in relation to automobile air-bag use. This information could then be employed to more quickly deploy air-bags and/or to control their rate of deployment. Other instances of where prediction of future velocity values may be implemented is in controlling the operation of the moving object, in regulating the spacing of moving vehicles on an automated highway system and the like.

Past integrators and related methods for predicting velocity from accelerometer samples have been polynomial based and have been documented as not providing accurate predictions. A skilled artisan is aware that a general explicit linear multi-step integration method can be written as $$f(t) = \sum_{n=1}^{N} a_n^{(0)} f(t-nT) + T \sum_{n=1}^{N} a_n^{(1)} f'(t-nT), \quad (1)$$

where T is the uniform sampling interval. Traditional methods usually assume knowledge of only one function value, and that is generally chosen as the most recent value, to give a formula of the form $$f(t) = a_1^0 f(t-T) + T \sum_{n=0}^{N-1} a_n^1 f'(t-nT). \quad (2)$$

Typically, samples of acceleration are integrated to obtain a velocity value. Thus, samples of f'(t) represent acceleration samples and f(t−T) represents a corresponding velocity value.

When the coefficients in formulas similar to Equation (2) are computed so that the formula is accurate for the highest degree polynomials possible, then one obtains the well-known Adams-Bashforth (AB) method. For example, N=1 gives the Euler formula $$f(t)=f(t-T)+Tf'(t-T), \quad (3)$$

or with N=2 one obtains the AB two-step method, $$f(t) = f(t-T) + T\left[\frac{3}{2} f'(t-T) - \frac{1}{2} f'(t-2T)\right] \quad (4)$$

The three-step AB formula is $$f(t) = f(t-T) + \quad (5)$$

$$T\left(\frac{23}{12} f'(t-T) - \frac{16}{12} f'(t-2T) + \frac{5}{12} f'(t-3T)\right)$$

valid for polynomials of the third degree. Such formulas can be derived by using Lambert's equations and by using matrix methods to find the coefficients in the formula. These AB methods are explicit methods, since they are based on past samples of the function and derivative.

Predictor-corrector integration methods employ both a predictor, which is an explicit type of formula as given above, as well as a corrector, which is an implicit formula that includes a current value of the derivative, i.e., f'(t). The Adams-Moulton (AM) family of formulas is the usual companion to the AB family of equations described above and is similarly polynomial-based. The coefficients in the corrector formula, $$f(t) = b_1^{(0)} f(t-T) + T \sum_{n=0}^{N-1} b_n^{(1)} f'(t-nT) \quad (6)$$

are chosen so that the formula is accurate for polynomials of the highest degree possible. The AM-one (trapezoidal) and AM-two step formulas are given, respectively, by $$f(t)=f(t-T)+T[1/2f'(t)+1/2f'(t-T)] \quad (7)$$

$$f(t)=f(t-T)+T[5/12f'(t)+8/12f'(t-T)-1/12f'(t-2T)] \quad (8)$$

Any method utilizing the above equations for predicting velocity or for determining any appropriate function from knowledge of its derivative's values are based upon the polynomial and have not been established as providing the most accurate predictions thereof.

DISCLOSURE OF INVENTION

Based on the foregoing, it is a first aspect of the present invention to provide a method for predicting future velocity or function values utilizing acceleration or derivative values related thereto.

Another aspect of the present invention, as set forth above, is to use a sensor associated with an object for predicting the velocity or the function values of the object.

Still another aspect of the present invention, as set forth above, is to provide a processor with a prediction formula, which when provided with predetermined variables such as a sampling rate and a frequency value, generates prediction coefficients for the prediction formula, which in turn predicts the velocity or other function value of the object.

A further aspect of the present invention, as set forth above, is to generate the prediction coefficients by either Gaussian elimination or by computing eigenvectors.

Yet a further aspect of the present invention, as set forth above, is to correct the predicted future velocity or function value by including a current sample of the acceleration or derivative value in a prediction-correction formula.

The foregoing and other aspects of the present invention, which shall become apparent as the detailed description proceeds, are achieved by a method for calculating a future function value associated with an object from derivative values associated with the object, to then control operation of the object, comprising the steps of: using a sensor coupled to the object for generating derivative values; predetermining a sampling rate T of the derivative values; determining a highest frequency W in the sampled signal; acquiring at least one function value from the sensor; determining a value for τ by multiplying 2*T*W, wherein τ is a Nyquist value, and wherein τ must always be less than one; computing prediction coefficients for use in a prediction formula, wherein the prediction coefficients are found by minimizing the integral $$\int_{-2\pi TW}^{2\pi TW} \left| 1 - a_k^{(0)} e^{-ik\omega} - \sum_{n=1}^{N} a_n^{(1)} i\omega e^{-in\omega} \right|^2 d\omega$$

wherein said prediction formula is in the form of $$f(t) = a_k^{(0)} f(t - kT) + T \sum_{n=1}^{N} a_n^{(1)} f'(t - nT),$$

to generate a future function value; and utilizing the future function value to control operation of the object.

In accordance with other aspects of the present invention, as set forth above, the method can generate corrected-predicted values by incorporating current derivative values of the monitored object. The method may also utilize a look-up table to store prediction coefficients based on pre-selected criteria.

BRIEF DESCRIPTION OF THE DRAWING

The drawing is a schematic representation of a system which incorporates the concepts of the present invention.

BEST MODE FOR CARRYING OUT THE INVENTION

Referring now to the drawing, it can be seen that a system according to the present invention is designated generally by the numeral 10. As shown, the system 10 is configured to monitor the operational characteristics of an object 12. By way of example, the object 12 may be any moving object such as an automobile, or any item that has a function value and a derivative value associated therewith. In order to obtain the function and derivative values, a sensor 14 is coupled to the object 12. By way of example, the sensor 14 may be an accelerometer which generates acceleration values for the object 12. The sensor 14 generates a control signal 16, which includes the function and derivative values, that is received by a processor 18. As will be appreciated by those skilled in the art, the processor 18 includes the necessary hardware, software and memory to facilitate the operation of the system 10. Generally, the processor 18 receives the control signal 16, and based upon the function and derivative values received, predicts a future function value. In the event certain parameters—such as a sampling rate and frequency—are known, the processor can predetermine the prediction coefficients and transfer them for storage to a computer-readable medium in the form of a look-up table 20. As a result, the table 20 may be used to more quickly process the control signal 16. Based upon the predicted function value, the processor 18 generates a control signal 22 which is received by a control object 24, the object 12, or both. By way of example, the control object 24 could be an air-bag actuation device which, based upon a predicted future velocity value, could control the rate of deployment of the air bag when a crash event is detected by other sensors. Another possible application of use of a predicted future velocity value is in computer controlled highway systems where the speed of a plurality of automobiles must be controlled. As will be discussed in detail below, the processor 18 is configured to generate a future function value based upon at least derivative values associated with an object 12.

In order to implement the above sensor system 10, new prediction and correction formulas and combination predictor-corrector formulas have been developed which encompass the AB and AM methods, but go beyond them to provide high accuracy for many functions. The system 10 is employed for finite-energy, band-limited signals using classical methods. These prediction and correction formulas are optimal in the sense that they minimize the error over the entire class of band-limited signals. It will also be shown that the methods are applicable to functions which may be considered as Fourier transforms of band-limited (tempered) distributions. Using Paley-Wiener representations for distributions, the resulting coefficients are shown to be precisely those obtained with the classical approach. But, by utilizing the disclosed methods, the formulas may apply to functions of polynomial growth which may be oscillatory in nature, as well as to finite-energy signals. It will be appreciated that although the AB-AM formulas are exact for some polynomials, their application to highly composite or periodic functions can involve large errors. As will be seen from the discussion below, these types of large errors are eliminated by use of the formulas described below.

Predictor for Finite Energy, Band-Limited Signals

The sensor 14 generates a control signal 16 in the form of samples from a finite energy, band-limited signal, wherein the highest frequency, W (in Hertz), in the signal is known. Presently it is assumed that the Fourier representation of the signal 16 is given by the Paley-Wiener theorem, i.e., $$f(t) = \int_{-W}^{W} F(\omega) e^{2\pi i \omega t} d\omega \qquad (9)$$

for F∈L²([−W,W]), where this choice of the Fourier representation allows for easier reference to the Nyquist condition, and where i=√−1. It is equivalent to the representation, $$f(t) = \frac{1}{2\pi} \int_{-2\pi W}^{2\pi W} F_1(\omega) e^{i\omega t} d\omega, \qquad (10)$$

The plurality of prediction coefficients are determined by minimizing the error in the prediction. This is accomplished by providing a slight generalization to Equation (2) to allow the function sample to be $f(t-kT)$, for $k \geq 1$ and let ε be the (squared) error of the prediction, given by $$\epsilon = \left| f(t) - a_k^{(0)} f(t - kT) - T \sum_{n=1}^{N} a_n^{(1)} f'(t - nT) \right|^2 \qquad (11)$$

Using the Fourier representation in Equation (9) for the signal and a Cauchy-Schwarz formula, a bound on the error ε is given by $$\epsilon \le \left\{ \frac{1}{2\pi} \int_{-2\pi W}^{2\pi W} |F_1(\omega)|^2 d\omega \right\} \left\{ \frac{1}{2\pi} \int_{-2\pi W}^{2\pi W} |d(\omega T)|^2 d\omega \right\} \quad (12)$$

where $$d(\omega) = 1 - a_k^{(0)} e^{-ik\omega} - \sum_{n=1}^{N} a_n^{(1)} i\omega e^{-in\omega} \quad (13)$$

Note that Equation (12) has the form $$\epsilon \le \|f\|^2 \cdot \epsilon_I \quad (14)$$

where $\epsilon_I$ is the second integral in Equation (12) and $\|f\|$ is the energy, or the $L^2$-norm of the signal $f$. Once the optimal prediction coefficients are determined, Equation (14) serves as an upper bound on the error in the prediction. Optimal coefficients are found by minimizing the error over the class of band-limited, finite energy signals by minimizing $\epsilon_I$, i.e., the integral $$\int_{-2\pi TW}^{2\pi TW} \left| 1 - a_k^{(0)} e^{-ik\omega} - \sum_{n=1}^{N} a_n^{(1)} i\omega e^{-in\omega} \right|^2 d\omega \quad (15)$$

An important parameter in the following is defined by the $$\tau := 2TW \quad (16)$$

This definition of $\tau$ is related to the Nyquist condition for signal reconstruction, as $\tau<1$ is equivalent to the usual Nyquist condition as expressed by $1/T>2W$, i.e., the sampling rate must be greater than twice the highest frequency. This condition is also important as the value of $\tau$ is the primary determinant in the following application of the disclosed method to a particular signal. It is generally thought that $\tau<1$ is a sufficient condition for signal reconstruction for finite energy signals from derivative samples as considered herein.

It will be appreciated by those skilled in the art that minimization of Equation (15) provides a set of prediction coefficients that, through the inequality shown in Equation (14), provide accurate predictions for the entire class of finite energy, band-limited signals. In particular, the same set of prediction coefficients applies to all the band-limited signals whose bandwidth fits into the interval $[-2\pi W, 2\pi W]$.

Generally, a minimization of Equation (15) by Gaussian elimination can be utilized to show that the prediction coefficients are the solution vector a of the matrix system $H \cdot a = b$, where H is a symmetric, block Toeplitz matrix that has the form, $$H = \begin{bmatrix} H_{0,0} & H_{0,1} \\ H_{0,1}^T & H_{1,1} \end{bmatrix} \quad (17)$$

Here, $H_{0,0}$ is a 1×1 size matrix with entry $H_{0,0}(1,1)=\text{sinc}(0):=1$, under the standard definition of $\text{sinc}(t):=\sin(\pi t)/(\pi t)$. Also, matrix $H_{0,1}$ is 1×N size with $H_{0,1}(1,n)=-\tau\text{sinc}'((n-k)\tau)$ for $1 \le n \le N$. And $H_{1,1}$ is N×N with $H_{1,1}(m,n)=-\tau^2\text{sinc}''((m-n)\tau)$ for $1 \le m$, $n \le N$. In the matrix system, the vector a is the vector of prediction coefficients, i.e., $$a = [a_k^0, a_1^1, \ldots, a_1^N]^{tr}.$$

The right side vector, vector b is (N+1)×1 size with $b=[\text{sinc}(k\tau), -\tau\text{sinc}'(\tau), \ldots -\tau\text{sinc}'(N\tau)]^{tr}$. k is an integer $\ge 1$ as in Equation (11 and "tr" means "transpose," a matrix operation.

$$H = \begin{bmatrix} s(0) & s_1((1-k)\tau) & s_1((2-k)\tau) & \ldots & s_1((N-k)\tau) \\ s_1((1-k)\tau) & s_2(0) & s_2(\tau) & \ldots & s_2((N-1)\tau) \\ s_1((2-k)\tau) & s_2(\tau) & s_2(0) & \ldots & \ldots \\ \ldots & \ldots & \ldots & \ldots & \ldots \\ s_1((N-k)\tau) & s_2((N-1)\tau) & \ldots & \ldots & s_2(0) \end{bmatrix} \quad (18)$$

where $s(t) := \text{sinc}(t)$, $s_1(t) := -\tau s'(t)$ and $s_2(t) := -\tau^2 s''(t)$.

Note that the prediction coefficients are determined from the above matrix system based primarily on the value of $\tau$, which is determined once the sampling interval T is chosen and a bound on the highest frequency W is known.

Alternatively, the prediction coefficients may be found for the class of finite energy, band-limited signals by employing a specific eigenvector of a matrix which is closely related to matrix H in Equation (17). This method is computationally more stable than using Gaussian elimination to solve the system from Equation (17)

The primary relation used in this alternative approach comes from the observation that the integral, $$\int_{-\pi\tau}^{\pi\tau} \left| a_0 - a_k^{(0)} e^{-ik\omega} - \sum_{n=1}^{N} a_n^{(1)} i\omega e^{-in\omega} \right|^2 d\omega \quad (19)$$

is a quadratic form (Av, v) for a Hermetian matrix, A, to be described below, and the vector v as the vector $$[a_0, a_k^{(0)}, a_1^{(1)}, \ldots, a_N^{(1)}]^{tr}.$$

Vector v is an augmented vector relative to the vector of prediction coefficients, $$a = [a_0, a_k^{(0)}, a_1^{(1)}, \ldots, a_N^{(1)}]^{tr}.$$

Such a quadratic form is known to have its minimum as the value of the smallest eigenvalue, $\lambda_n$, of the matrix A with the minimum achieved for the associated eigenvector. The associated eigenvector has one more component than vector a. When the eigenvector is normalized so that its first component equals 1, then Equation (19) reduces to Equation (15), and the second through N+1st components of the eigenvector form the solution vector a which are the prediction coefficients. The computation of the eigenvector is more stable than the Gaussian elimination method and provides a more accurate set of prediction coefficients. In other words, the numerics of computing one eigenvector are such that the eigenvector calculation is more accurate than solving a system of equations by Gaussian elimination.

The matrix associated with Equation (19) contains matrix H and vector b of Equation (17) as submatrices. In an interesting juxtaposition, the vector b makes up all but the first element in the first column of A, wherein A may be defined as a block matrix, $$A = \begin{vmatrix} s(0) & b^{tr} \\ b & H \end{vmatrix} \quad (20)$$

Here, submatrix H is from Equation (17) as the system matrix for the method of Gaussian elimination, b is the right side of that system, and $s(0) = \text{sinc}(0) = 1$.

An application of the predictor, with coefficients calculated by either of the above methods, has been found to be much more accurate for functions with oscillation, such as those with positive frequency bound W.

Corrector

In addition to the prediction method described above, which depends on past samples of acceleration, it will be appreciated that an "implicit" method depends on a past sample of velocity and on a past and a current sample of acceleration. The resulting "corrector" formula is similar to well-known polynomial-based methods which have the general form of Equation (6). Note that the index n=0 results in f'(t) being used, that is, the current value of the derivative or acceleration is employed.

In order to obtain the optimal prediction coefficients described above, it was assumed that the value of the parameter $\tau=2TW$ is known. For this value of $\tau$, the values of the corrector coefficients in Equation (6) are calculated similarly to what was done for the predictor shown in Equation (2). Minimizing the errors is done by determining coefficient values to minimize the integral $$\frac{1}{2\pi T}\int_{-\pi\tau}^{\pi\tau}\left|1-b_1^{(0)}e^{-i\omega}-\sum_{n=0}^{N-1}b_n^{(1)}i\omega e^{-in\omega}\right|^2 d\omega. \quad (21)$$

The minimization process can be done by either solving a matrix system as above or by finding the eigenvector associated with the smallest eigenvalue of quadratic form given by Equation (21). The matrices for this corrector are similar to those described for the predictor formula, as they are Toeplitz block matrices depending on values of sinc functions evaluated at appropriate multiples of $\tau$.

One advantage of this implicit corrector method is higher accuracy in the estimate of $f(t)$ than when using the predictor formula. This accuracy has been verified by numerical experiments. An example comparing the relative errors of the predictor formula and the corrector formula is given in Table 1 for the signal $f(t)=2t^2\cos(\tau Wt)+t^3\text{sinc}(Wt)$, which has polynomial growth properties. This table shows the high accuracy of each method as the first column lists the true value with the subsequent columns providing the relative errors. The different rows are for predictions at a number of different time points, each one using $\tau=0.4$ and $N=20$ data points. Note that the same prediction coefficients are used for all time points.

TABLE 1

| True Value     | Error: Predictor | Error: Corrector |
|----------------|------------------|------------------|
| 6.2594e + 01   | 7.30e – 03       | 6.58e – 05       |
| –1.0129e + 02  | 6.04e – 03       | 8.76e – 05       |
| 1.0131e + 02   | 2.43e – 03       | 5.54e – 05       |
| –6.2622e + 01  | 1.09e – 02       | 7.72e – 05       |
| –6.2629e + 01  | 3.61e – 03       | 1.43e – 04       |
| 1.0135e + 02   | 7.01e – 04       | 3.99e – 05       |
| –1.0137e + 02  | 4.32e – 03       | 1.03e – 04       |
| 6.2657e + 01   | 6.67e – 06       | 5.97e – 08       |
| 6.2664e + 01   | 7.29e – 03       | 6.59e – 05       |
| –1.0140e + 02  | 6.04e – 03       | 8.76e – 05       |
| 1.0143e + 02   | 2.42e – 03       | 5.55e – 05       |
| –6.2692e + 01  | 1.09e – 02       | 7.72e – 05       |

As the relative errors in Table 1 show, the high accuracy in the predictor formula is exceeded by about two extra digits of accuracy in the corrector formula in each time sample. In determining the value of the parameter $\tau$, see Equation (16), to use, the highest frequency W present in the signal is critical. For the example above, the value of W used was simply the highest frequency of the example function. For the class of band-limited functions, the present method applies for accurate predictions whenever the $\tau$, and thus the W value, is greater or equal to the actual highest frequency of the signal. However, the method may diverge if the value for $\tau$ is chosen too small.

Inclusion of the corrector formula provides increased stability with respect to noise. It has been found that the size of the coefficients in the corrector formula remain near or less than one in magnitude, while the prediction coefficients are occasionally much larger. As best seen in Table 2, the values of the coefficients for each formula for the case of $\tau=0.4$ and $N=10$. The smaller magnitudes of the corrector coefficients means that noise would not be magnified in an application of the corrector.

TABLE 2

| Coefficient | Predictor | Coefficient | Corrector |
|-------------|-----------|-------------|-----------|
| $a_1^{(0)}$    | 1.000     | $b_1^{(0)}$    | 1.0000    |
| $a_1^{(1)}$    | 3.087     | $b_0^{(0)}$    | 0.3161    |
| $a_2^{(1)}$    | –7.294    | $b_1^{(1)}$    | 1.1165    |
| $a_3^{(1)}$    | –14.431   | $b_2^{(1)}$    | –0.9974   |
| $a_4^{(1)}$    | –21.229   | $b_3^{(1)}$    | 1.2056    |
| $a_5^{(1)}$    | 23.638    | $b_4^{(1)}$    | –1.12148  |
| $a_6^{(1)}$    | –20.026   | $b_5^{(1)}$    | 0.9968    |
| $a_7^{(1)}$    | 12.727    | $b_6^{(1)}$    | –0.5881   |
| $a_8^{(1)}$    | –5.828    | $b_7^{(1)}$    | 0.2604    |
| $a_9^{(1)}$    | 1.750     | $b_8^{(1)}$    | –0.0761   |
| $a_{10}^{(1)}$ | –0.268    | $b_9^{(1)}$    | 0.0114    |

Application of the above corrector can complete a table of velocity values over a large time interval just by using one initial sample of velocity and updated samples of acceleration over the interval. In other words, by virtue of the accuracy in the corrector formula, the value of velocity used, that is, $f(t-T)$ as listed in Equation (6), never needs to be updated in the sense of obtaining a new velocity value from the sensor 14.

The corrector may be used to fill in a complete set of velocity values from updated acceleration samples by repeatedly applying the corrector equation. Initially, the past and the present value of acceleration and the one value of velocity are combined in the corrector method to calculate $f(t)$ as in Equation (6). Next, a new value of acceleration is obtained from the sensors at a time t+T. Then the same corrector method is applied with the computed $f(t)$ and the shifted set of samples, still totaling N in all, to obtain the next velocity value $f(t+T)$. Equation (6) looks shifted in the case, with the form $$f(t+T) = a_1^0 f(t) + T\sum_{n=0}^{N-1} a_n^1 f'(t+T-nT). \quad (22)$$

Note that the coefficients are the same as before and do not need to be updated. This process may be iterated until an entire interval of velocity values is obtained. It has been found that errors in function values are stable and controlled utilizing the above equations. It will be appreciated that the entire interval of function or velocity values and corrector coefficients may be stored in the look-up table 20 as described above.

As noted above, an error formula (11) was considered for the prediction formula $$f(t) = a_k^{(0)} f(t-kT) + T\sum_{n=1}^{N} a_n^{(1)} f'(t-nT), \quad (23)$$

with the dependence of the prediction on the function "velocity" value $f(t-kT)$ at a time value, $t-kT$ with $1 \leq k \leq N$. The well-known integration schemes use $k=1$.

The accuracy of the estimation of the function $f(t)$ is equally good if $k>1$. In several numerical experiments, computations reveal that the accuracy is slightly improved if $1<k<N$. Accuracy is approximately the same at $k=1$ as at $k=N$. It is noted, however, that the size of the coefficients, such as those listed in Table 2, grow as k is made larger than one. It is theorized that the improved accuracy is present in function estimation using Equation (23) when $1<k<N$ for the complete class of functions considered above.

A preferred device and related method of predicting a future function value incorporating the concepts of the present invention is shown by way of example in the accompanying drawing and specification without attempting to show all the various forms and modifications in which the invention might be embodied, the invention being measured by the appended claims and not by the details of the specification.

What is claimed is:

1. A method for calculating a future function value associated with an object from derivative values associated with the object, to then control operation of the object, comprising the steps of:

providing a sensor coupled to the object for generating derivative values;

predetermining a sampling interval T of the derivative values;

low pass filtering the derivative values to generate a high frequency value W;

acquiring at least one function value from the sensor;

determining a value for $\tau$ by multiplying $2*T*W$, wherein 2 is a Nyquist value, and wherein $\tau$ must always be less than one;

computing a which is the solution vector of predictor coefficients in a $(N+1) \times 1$ size matrix in the form $a=[a_k^{(0)}, a_1^{(1)}, \ldots, a_N^{(1)}]$ for use in a prediction formula, wherein the prediction coefficients are found by minimizing the integral $$\int_{-2\pi TW}^{2\pi TW} \left| 1 - a_k^{(0)} e^{-ik\omega} - \sum_{n=1}^{N} a_n^{(1)} i\omega e^{-in\omega} \right|^2 d\omega$$

wherein said prediction formula is in the form of $$f(t) = a_k^{(0)} f(t-kT) + T \sum_{n=1}^{N} a_n^{(1)} f'(t-nT)$$

wherein N=the number of data points, wherein n=an integer 1 to N, and wherein k=an integer $1 \leq k \leq N$ used to adjust the calculated result closer to the actual result to generate a future function value f(t); and utilizing the future function value to control operation of the object.

2. The method according to claim 1, wherein said computing step comprises the step of:

computing a=solution vector of a matrix system $H \cdot a = b$, where H is a symmetric matrix with diagonal Toeplitz blocks that has the form, $$H = \begin{bmatrix} H_{0,0} & H_{0,1} \\ H_{0,1}^T & H_{1,1} \end{bmatrix}$$

and wherein $b=[\text{sinc}(k\tau), -\tau\text{sinc}'(\tau), \ldots -\tau\text{sinc}'(N\tau)]$.

3. The method according to claim 1, wherein said computing step comprises the step of:

computing an eigenvector associated with the smallest eigenvalue of a quadratic form expressed as the integral $$\int_{-2\pi TW}^{2\pi TW} \left| 1 - a_k^{(0)} e^{-ik\omega} - \sum_{n=1}^{N} a_n^{(1)} i\omega e^{-in\omega} \right|^2 d\omega.$$

4. The method according to claim 1, further comprising the step of:

correcting the predicted future function by including a current sample of the derivative generated by said sensor by utilizing the following equation $$f(t) = b_1^{(0)} f(t-T) + T \sum_{n=0}^{N-1} b_n^{(1)} f'(t-nT)$$

with the prediction formula, wherein the corrector coefficients, $$b_1^{(0)}, b_0^{(1)}, \ldots, b_{N-1}^{(1)},$$

are found by minimizing the integral $$\frac{1}{2\pi T} \int_{-\pi\tau}^{\pi\tau} \left| 1 - b_1^{(0)} e^{-i\omega} - \sum_{n=0}^{N-1} b_n^{(1)} i\omega e^{-in\omega} \right|^2 d\omega.$$

5. The method according to claim 4, wherein the function value and its derivative are velocity and acceleration, respectively.

6. The method according to claim 1, further comprising the steps of;

calculating the prediction coefficients for preselected values of $\tau$ and W; and storing the calculated prediction coefficients in a computer-readable medium.

7. The method according to claim 6, further comprising the steps of coupling a processor to said sensor to read the derivative and function values; and accessing said computer-readable medium by said processor, wherein said processor determines the future function value based upon function values and derivative values and generates an appropriate signal for control of the object.

* * * * *